Figure 1:
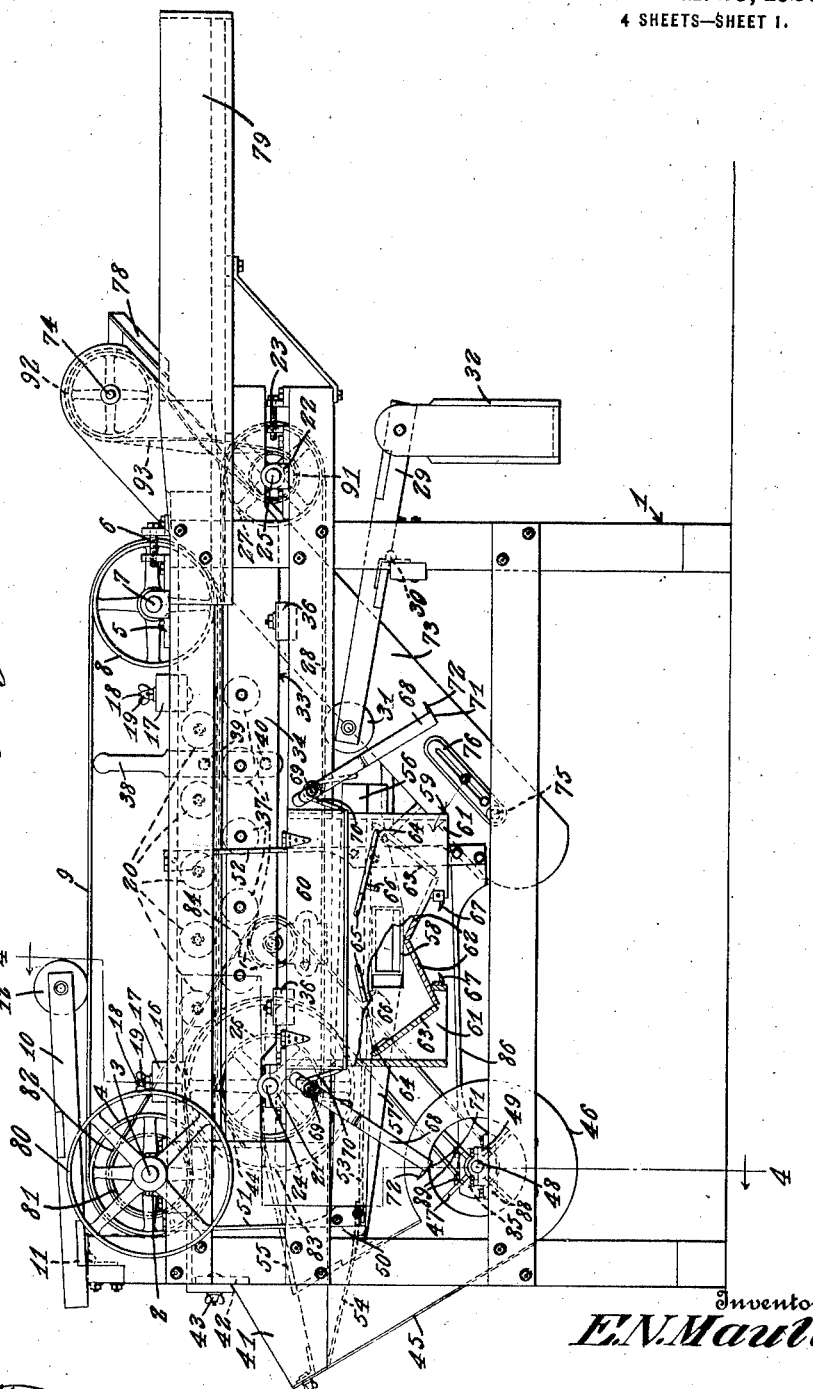

E. N. MAULL.
HULLING AND CLEANING MACHINE.
APPLICATION FILED JAN. 13, 1919.

1,334,708.

Patented Mar. 23, 1920.
4 SHEETS—SHEET 1.

Witness

Inventor
E. N. Maull,
By C. A. Snow & Co.
Attorneys

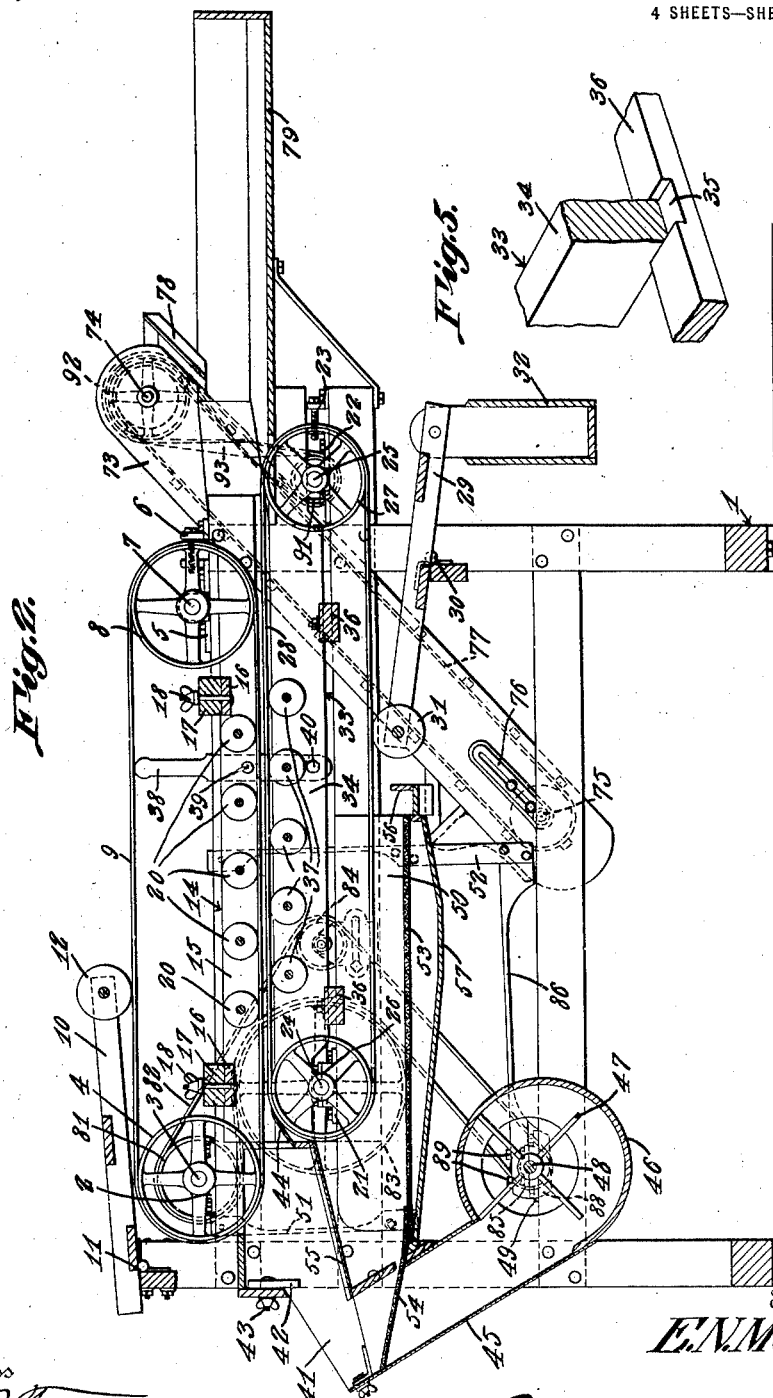

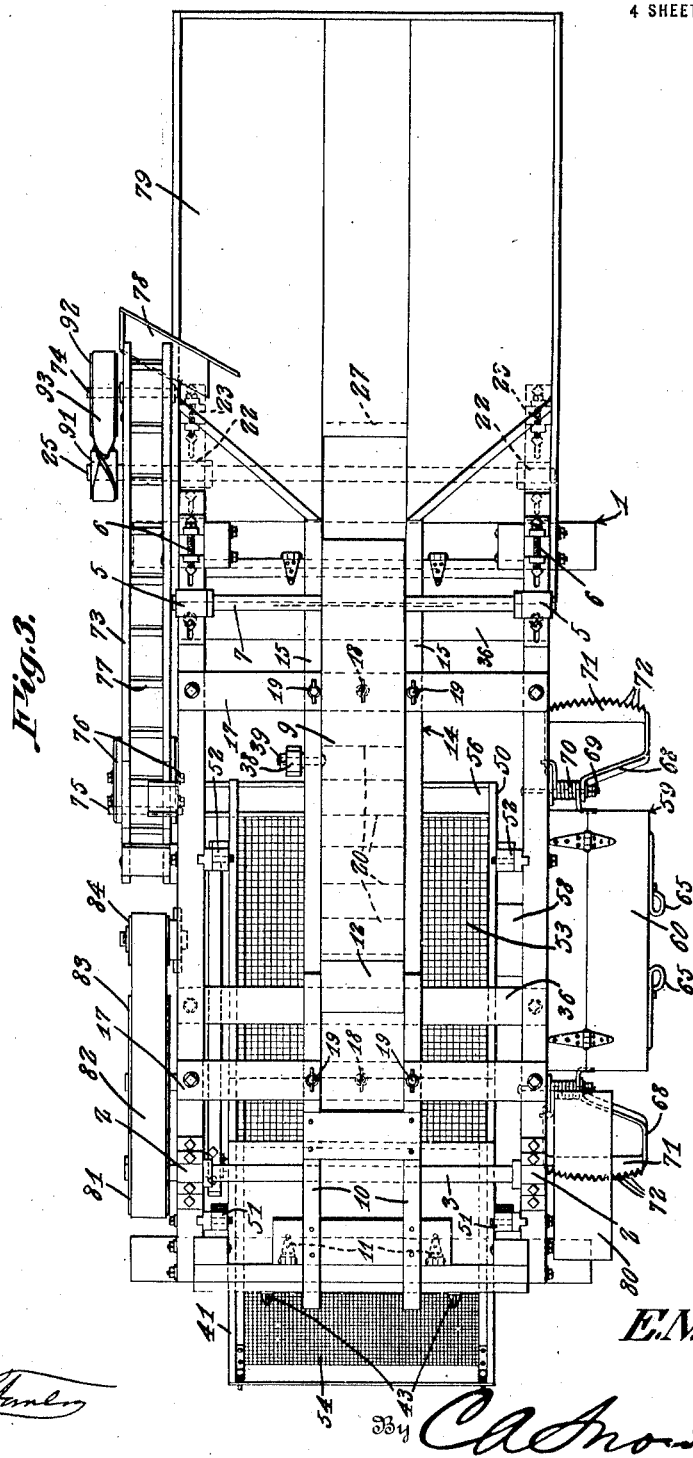

E. N. MAULL.
HULLING AND CLEANING MACHINE.
APPLICATION FILED JAN. 13, 1919.
1,334,708.
Patented Mar. 23, 1920.
4 SHEETS—SHEET 4.
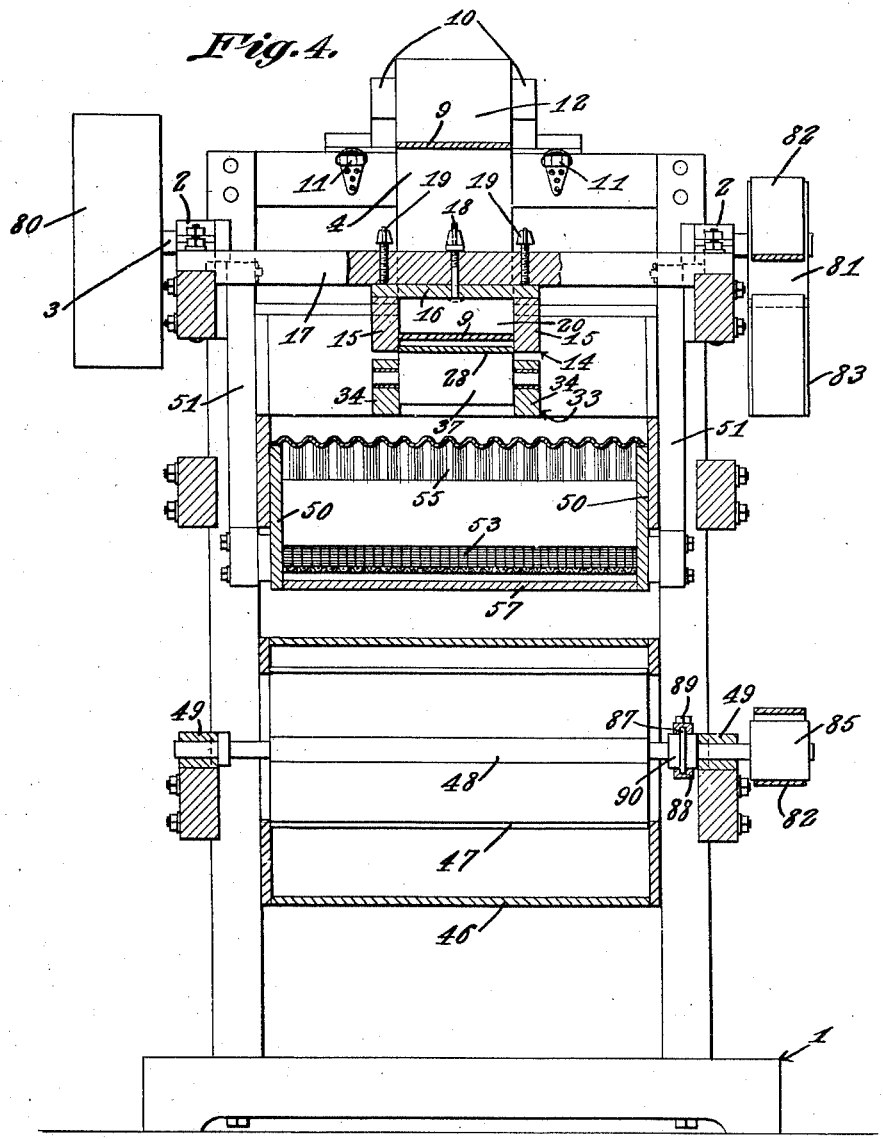
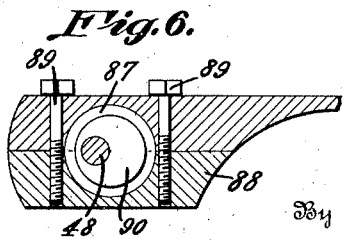

UNITED STATES PATENT OFFICE.

EDWARD N. MAULL, OF JACKSONVILLE, FLORIDA, ASSIGNOR TO SIMON F. WILLIAMS, OF JACKSONVILLE, FLORIDA.

HULLING AND CLEANING MACHINE.

1,334,708. Specification of Letters Patent. Patented Mar. 23, 1920.

Application filed January 13, 1919. Serial No. 270,900.

*To all whom it may concern:*

Be it known that I, EDWARD N. MAULL, a citizen of the United States, residing at Jacksonville, in the county of Duval and State of Florida, have invented a new and useful Hulling and Cleaning Machine, of which the following is a specification.

The device forming the subject matter of this application is adapted to be used for hulling and for cleaning castor beans, peanuts and like products.

The invention aims to provide novel means whereby the articles which are being hulled will be subjected, alternately, to varying pressures, and be rolled, to free the seeds from the pods or hulls.

Another object of the invention is to provide novel means whereby the vertical space between the hulling belts may be adjusted, depending on the nature of the product which is being hulled.

A further object of the invention is to provide novel means for caring for the seeds after they have been hulled. The invention contemplates the provision of means whereby any beans or the like, which may happen to pass through the machine without being hulled, will be returned to the inlet end of the device and be subjected again to the hulling action.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a machine constructed in accordance with the invention; Fig. 2 is a longitudinal section of the machine, parts remaining in elevation; Fig. 3 is a top plan; Fig. 4 is a cross section taken approximately on the line 4—4 of Fig. 1; and Fig. 5 is a fragmental perspective showing the slidable mounting of one of the frames. Fig. 6 is a sectional detail showing a part of the means for actuating the shaker rack.

In carrying out the invention, there is provided a supporting structure 1, the construction of which may be changed, without jeopardizing the utility of the invention. The supporting structure will be alluded to generally, at this point, and those parts of the supporting structure which have particular functions, will be mentioned as the description progresses. Fixed bearings 2 are mounted on the supporting structure 1, near to one end thereof, and in the bearings a shaft 3 is journaled, the shaft 3 carrying a wheel 4 located within the contour of the supporting structure 1. Movable bearings 5 are mounted on the supporting structure 1 and are adapted to be slid longitudinally of the supporting structure, through the instrumentality of adjusting devices 6 of any desired sort. The bearings 5 carry a shaft 7 on which a wheel 8 is mounted. About the wheels 4 and 8 is trained a first belt 9, it being obvious that the belt may be tightened or loosened by moving the bearings 5 through the medium of the adjusting devices 6. A lever 10 is fulcrumed or hinged at one end as shown at 11 on the supporting structure 1, a roller 12 being journaled on the inner end of the lever. The roller 12 bears on the upper run of the belt 9 and aids in keeping the belt taut.

The invention comprises a first frame 14, extended longitudinally of the supporting structure 1, within the contour thereof, and including side beams 15 connected at their upper edges by ties 16. The supporting structure 1 comprises cross pieces 17 carrying suspension bolts 18 engaged with the cross pieces 17 of the first frame 14. Depression screws 19 are threaded into the cross pieces 17 and bear upon the ties 16 of the first frame 14. Rollers 20 are journaled in the side beams 15 of the first frame 14 and coöperate with the lower run of the upper or first belt 9, in a manner which will be understood clearly when Fig. 2 is examined.

There are fixed bearings 21 on the supporting structure 1, near to the fixed bearings 2, movable bearings 22 being mounted on the supporting structure, near to the movable bearings 5. The movable bearings 22 may be slid longitudinally of the supporting structure 1 by means of adjusting devices 23. A shaft 24 is journaled in the fixed bearings 21, a shaft 25 being journaled in the movable bearings 22, the shaft 24 carrying a wheel 26, and there being a wheel 27 on the shaft 25. About the wheels 26 and 27 is trained a lower or second belt 28, disposed below the upper or first belt 9. A lever 29 is fulcrumed intermediate its ends, as shown at 30, upon the supporting structure 1, one end of the lever carrying a roller 31 coacting with the lower run of the second belt 28, a weight box 32 being pivoted to the outer end of the lever 29. Obviously, the construction is such that the roller 31 and the parts which carry and coöperate with the roller, form a tightener for the second or lower belt 28.

A second frame 33 is disposed within the supporting structure 1 and comprises connected side beams 34 mounted to slide in seats 35 (see Fig. 5) formed in cross pieces 36 which extend transversely of the supporting structure 1 and constitute parts thereof. Rollers 37 are journaled on the side beams 34 of the second frame 33 and coöperate with the upper run of the lower belt 28. At this point, it may be observed that the rollers 20 and 37 are arranged in alternating order, longitudinally of the machine. A lever 38 is fulcrumed as shown at 39, between its ends, on one of the side beams 15 of the first frame 14, the lower end of the lever being pivoted as indicated at 40, to the corresponding side beam 34 of the second frame 33.

A casing 41 is mounted on one end of the supporting structure 1 and includes an adjustable gate 42 the position of which is regulated by means of thumb screws 43 or otherwise. A chute 44, carried by the supporting structure 1, coöperates with the lower or second belt 28 and discharges into the casing 41. The casing 41, in its turn, discharges into the neck 45 of a blower casing 46 supported on the main frame structure 1, there being a fan 47 within the casing 46, the fan being carried by a transverse shaft 48 journaled in bearings 49 on the supporting structure 1.

The numeral 50 designates a shaker rack traversed in part by the lower belt 28 and suspended on yieldable hangers 51 connected at their upper ends with the supporting structure 1, and connected at their lower ends with the shaker rack 50. One of the hangers extends downwardly beyond the other hangers, and since this hanger has a specific function, it has been designated by the numeral 52. The shaker rack 50 carries a screen 53 and another screen 54 located in the neck 45 of the blower casing 46. The shaker rack 50 supports, also a corrugated table 55, receiving material from the chute 44 and discharging the material within the neck 45 of the blower casing, upon the shaker screen 54. The shaker rack 50 has a lateral chute 56 at its forward end adapted to receive material which traverses the screen 53 without passing therethrough. The shaker rack 50 carries a platform 57, inclined downwardly from its ends toward its central portion, the lowermost portion of the platform coöperating with an outlet tube 58 which may be carried by the shaker rack 50, the tube discharging into a receptacle 59 secured to one side of the supporting structure 1. The receptacle is provided with a hinged top lid 60 and has depending necks 61, as Fig. 1 will best disclose. Oppositely slanting deflectors 62, which are fixed, form the bottom of the receptacle 59 and discharge into the respective necks 61. Swinging gates 63 are located within the receptacle 59 and are adapted to coöperate with the outer ends of the deflectors 62, the gates being mounted on shafts 64 journaled in the receptacle and operated by means of cranks 65, located outside of the receptacle. The cranks 65 are adapted to coact with latches 66 on the receptacle 59, to hold the gates 63 in closed relation to the deflectors 62. On the inner sides of the necks 61 there are external prongs 67. Arms 68 are mounted on pivot elements 69 carried by the supporting structure 1, and are adapted to swing vertically. The arms 68 are constrained by springs 70 to swing in opposite directions away from the receptacle 59. The arms 68 carry end members 71 provided with outwardly projecting teeth 72.

An inclined conveyer frame 73 is connected to one side of the supporting structure 1, an upper shaft 74 being journaled in the frame 73, and a lower shaft 75 being journaled in adjustable bearings 76 mounted on the frame 73. A belt conveyer 77 traverses the frame 73 and is engaged about pulleys on the shafts 74 and 75. The upper end of the belt conveyer 77 discharges into an inwardly projecting chute 78 mounted on the supporting structure 1, the chute emptying into a hopper 79 discharging on the upper run of the lower or second belt 28, it being observed that the belt 28 projects to the right beyond the upper or first belt 9, so as to receive the material initially from the hopper 79. On one end of the shaft 3, a driving pulley 80 is mounted. On the other end of the shaft 3 there is a pulley 81 about which a belt 82 is engaged, the inner run of the belt 82 coöperating with a pulley 83 on the shaft 24, and the outer run of the belt coacting with an idler 84 suitably mounted on the supporting structure 1. The belt 82 is engaged about a pulley 85 on the blower shaft 48. The means for actuating the shaker rack 50 embodies a pitman 86 pivoted to the hanger 52 and carrying a strap 87 (Fig. 6), held in place by a block 88 and screws 89 or in any other suitable way, the strap coacting with an eccentric 90 mounted on the blower shaft 48. The shaft 25 is provided at one end with a pulley 91, there being a pulley 92 on the upper conveyer shaft 74. A crossed belt 93 coöperates with the pulleys 91 and 92.

Before discussing the operation of the machine, the driving trains will be traced out. The shaft 3 is operated from a source of power applied through the pulley 80 and when the shaft 3 is rotated, the wheels 4 and 8 will actuate the upper or first belt 9. From the shaft 3, motion is transmitted by way of the pulley 81 to the belt 82, the belt 82 coacting with the pulley 83 to drive the shaft 24 and, consequently, the lower or second belt 28, together with the shaft 25. The lower run of the belt 9 and the upper run of the belt 28 move in the same direction, but at different speeds, owing to the relative diameters of the various wheels and pulleys whereby these belts are operated, the lower run of the upper belt 9 traveling forwardly at a lineal speed equal possibly, to two or three times the lineal speed of the upper run of the lower belt 28. The shaft 25, driving the pulley 21 actuates the upper conveyer shaft 74 by way of the pulley 92 and the belt 93. The belt 82, being engaged around the pulley 85 on the blower shaft 48, operates the fan 47 and causes an updraft through the neck 45 of the blower casing 46 through the shaker screen 54 in the neck of the blower casing. The eccentric 90 on the blower shaft 48, coöperating with the strap 87 of the pitman 86, causes a reciprocation of the shaker rack 50 and parts carried thereby, it being recalled that the pitman is connected to one of the hangers 52 which supports the shaker rack.

Having thus described the manner in which the various movable parts of the structure are actuated, the passage of the material through the machine will now be traced out. The material (beans, peanuts or the like) is cast into the hopper 79 and is received on one end of the upper run of the lower belt 28, the material being carried between the upper run of the lower belt 28 and the lower run of the upper belt 9. Here the product is hulled in a way to be described in detail hereinafter, the hulls and the seed being delivered by way of the chute 44, and the table 55 of the shaker 50, upon the screen 54 in the neck 45 of the blower casing 46. The upward blast through the neck 45, resulting from the operation of the fan 47, ejects the hulls, the seed traversing the screen 54 and passing upon the screen 53 of the reciprocating shaker rack 50. The seed passes through the screen 54 and, traversing the platform 57, is delivered by the outlet tube 58 to the receptacle or bagging device 59. Here the seeds or kernels may be permitted to accumulate to any desired extent upon the deflectors 62, the material being held thereon by the gates 63, which are closed. Bags (not shown) may be engaged at one side by the prongs 67 on the necks 61, the bags being engaged at the opposite side, by the teeth 72 on the arms 68, the arms being swung toward each other, and then being permitted to swing outwardly, under the action of the springs 70. In this way, the bags will be held on the necks 61 of the receptacle 59 and, at any time, one or both of the gates 63 may be opened, by means of the cranks 65 to permit the accumulated material to flow into the bags.

Should any of the material have passed through the machine, without being hulled, such material will traverse the screen 53 of the shaker rack 50, and enter the cross chute 56, the unhulled material being transferred to the upwardly inclined belt conveyer 77 which, discharging into the chute 78, will restore the unhulled material to the hopper 79 for passage again through the machine.

By a proper manipulation of the suspension bolts 18 and the depression screws 19, the first or upper frame may be raised and lowered, along with the rollers 12 which the said frame carries. In this way, the lower run of the upper belt 9 may be adjusted with respect to the upper run of the lower belt 28, this operation being useful, since it enables the machine to handle products of different sizes.

A salient and important feature of the machine remains to be discussed and in this connection it is to be observed that the rollers 37 are disposed in alternating order with respect to the rollers 20. Further, by swinging the lever 38 on its fulcrum, the second or lower frame 33, along with the rollers 37, may be adjusted longitudinally of the machine, thereby to vary the space, measured horizontally, between the upper rollers 20 and the lower rollers 37. This operation is of a great importance, since, in effect, it serves to vary the flexibility of the coöperating runs of the belts 9 and 28, thus adapting the machine to products the hulls of which have different degrees of toughness. Since the upper rollers 30 are not alined, necessarily, with the lower rollers 37, the product is subjected to a varying pressure, as the product moves forward. It has been pointed out hereinbefore that the lower run of the upper belt 9 moves forwardly but faster than does the upper run of the lower belt 28, and, as a consequence, the product as it passes along between the coöperating runs of the belts is subjected to a rolling motion, under pressure, the operation being much the same as that produced when a bean, peanut or the like is rolled between the thumb and finger of the hand. This operation aids in opening or hulling the product, as will be understood readily by those skilled in the art.

Although other parts of the machine are by no means devoid of novelty, especial attention is directed to the longitudinally adjustable frame 33, the rollers 37, the frame 14, its rollers 20 and the coöperating runs of the belts 9 and 28 since these elements produce a peculiarly thorough and effective hulling of the beans, peanuts or other material which the machine is handling.

Having thus described the invention, what is claimed is:—

1. A machine of the class described, comprising rotatable members; upper and lower hulling belts engaged around the rotatable members and having coöperating runs; sets of elements coacting with the said runs of the belts and disposed between the rotatable members; and means for adjusting the elements of one set toward and away from the elements of the other set, in parallel relation thereto transversely of the belts.

2. A machine of the class described comprising rotatable members; upper and lower hulling belts engaged around the rotatable members and having coöperating runs; sets of elements coacting with the said runs of the belts and disposed between the rotatable elements; and means for adjusting the elements of one set toward and away from the elements of the other set, longitudinally of the belts.

3. A machine of the class described comprising rotatable members; upper and lower hulling belts engaged around the rotatable members and having coöperating runs; sets of elements coacting with the said runs of the belts and disposed between the rotatable members; means for adjusting the elements of one set toward and away from the elements of the other set transversely of the belts; and means for adjusting the elements of said other set toward and away from the elements of the first specified set, longitudinally of the belts.

4. A machine of the class described comprising rotatable members; upper and lower hulling belts engaged around the rotatable members and having coöperating runs; sets of elements coacting with the said runs of the belts and disposed between the rotatable members, the elements of one set being disposed in alternating order with respect to the elements of the other set longitudinally of the machine; and means for adjusting the elements of one set toward and away from the elements of the other set, in parallel relation thereto transversely of the belts.

5. A machine of the class described comprising rotatable members; upper and lower hulling belts engaged around the rotatable members and having coöperating runs; sets of elements coacting with said runs of the belts and disposed between the rotatable members, the elements of one set being arranged in alternating order with respect to the elements of the other set; and means for adjusting the elements of one set toward and away from the elements of the other set, longitudinally of the belts.

6. A machine of the class described comprising rotatable members; upper and lower hulling belts engaged around the rotatable members and having coöperating runs; sets of elements coacting with the said runs of the belts and disposed between the rotatable members, the elements of one set being disposed in alternating order with respect to the elements of the other set, longitudinally of the machine; means for adjusting the elements of one set toward and away from the elements of the other set, in parallel relation thereto transversely of the belts; and means for adjusting the elements of said other set, toward and away from the elements of the first specified set longitudinally of the belts.

7. A device of the class described comprising an upper hulling belt and a lower hulling belt, the belts being in the form of bands of appreciable width; a frame within the upper belt; a frame within the lower belt; means for moving the first specified frame, for adjustment, transversely of the belts; means for moving the last specified frame in the direction of its length, longitudinally of the belts; and transverse members carried by the frames, the transverse members of the first specified frame coöperating with the lower run of the upper belt, and the transverse members of the second specified frame coacting with the upper run of the lower belt.

8. In a machine of the class described, an upper hulling belt; a lower hulling belt projecting at its forward end beyond the forward end of the upper belt; a hopper discharging on the forward end of the lower belt; a shaker screen disposed below the lower belt; means for conducting material from the rear end of the lower belt to the shaker screen; a lateral chute on the forward end of the shaker screen and receiving material therefrom; an upwardly inclined conveyer whereinto the chute discharges; and an inwardly projecting chute receiving material from the conveyer and discharging the same into the hopper.

In testimony that I claim the foregoing as my own, I have hereto affixed my signature in the presence of two witnesses.

EDW. N. MAULL.

Witnesses:
  PAUL D. McGARRY,
  F. M. DURRANCE.